UNITED STATES PATENT OFFICE.

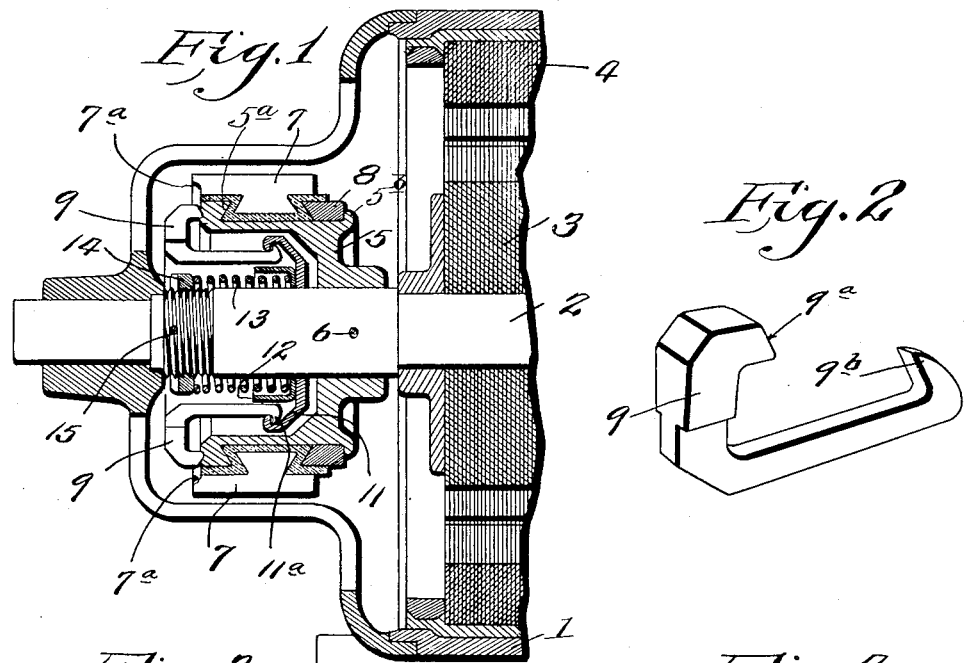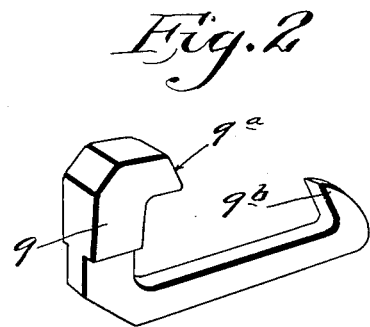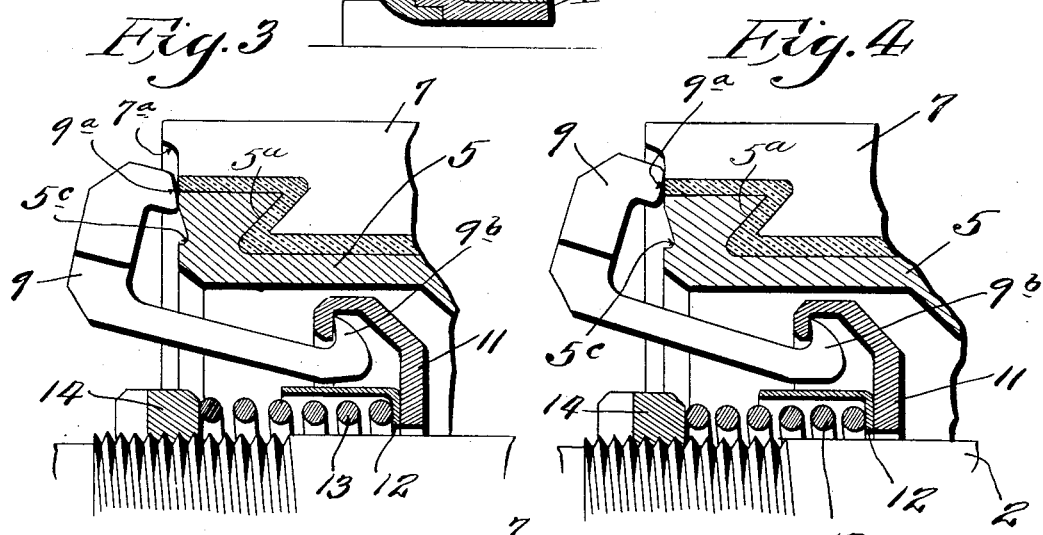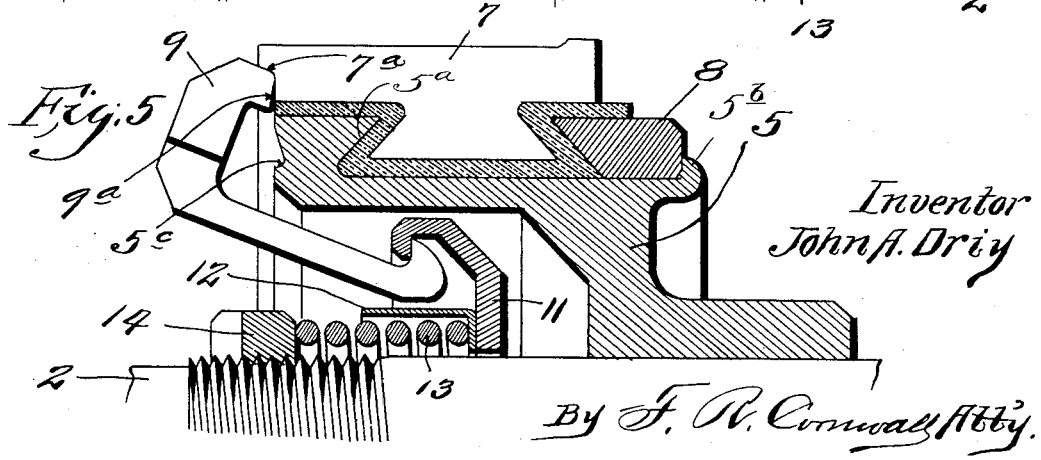

JOHN A. DRIY, OF ST. LOUIS, MISSOURI, ASSIGNOR TO THE EMERSON ELECTRIC MANUFACTURING COMPANY, OF ST. LOUIS, MISSOURI, A CORPORATION OF MISSOURI.

SHORT-CIRCUITING SEGMENTS FOR ELECTRIC MOTORS.

1,373,314.   Specification of Letters Patent.   Patented Mar. 29, 1921.

Application filed June 14, 1920. Serial No. 388,854.

*To all whom it may concern:*

Be it known that I, JOHN A. DRIY, a citizen of the United States, residing at St. Louis, Missouri, have invented a certain new and useful Improvement in Short-Circuiting Segments for Electric Motors, of which the following is a full, clear, and exact description, such as will enable others skilled in the art to which it appertains to make and use the same, reference being had to the accompanying drawings, forming part of this specification.

This invention relates to a new and useful improvement in short-circuiting devices for induction-repulsion motors and is designed particularly as an improvement upon devices of this character shown in the Bretch Patent No. 1,111,358, dated September 22, 1914, this application being a companion case to the application of Herbert I. Finch for improvement in electric motor short-circuiting mechanism filed June 12, 1920, Serial No. 388,495.

In general the operation of an induction-repulsion motor is briefly as follows:

In starting, a commutator is used in conjunction with a set of short-circuited brushes to short-circuit a definite portion of the armature winding which is in the proper relation with respect to the stator winding, to develop a torque whereby it is possible for the motor to attain a predetermined speed, after which the commutator is short-circuited and the motor thereafter operates as an induction motor. In attaining this starting torque and high speed, it is necessary that certain armature coils be short-circuited and this result is obtained by means of the commutator coöperating with the short-circuited brushes. Then when the motor approaches or attains a predetermined high speed, centrifugally operated devices are thrown outwardly to short-circuit the commutator and likewise short-circuit the coils, the motor thereafter operating as a motor of the induction type. When the speed of the motor is reduced, or the motor comes to rest, these short-circuiting devices move away from, or inwardly off of, the commutator segments whereby the coils are commutator-controlled and rendered effective for another starting operation.

In the construction shown in the Bretch patent, it has been found that under certain conditions, the short-circuiting segments are liable to stick and not reach their proper position in moving inwardly or outwardly, this sticking being due some times to a displacement of the insulation between the commutator segments and the commutator shell, or the absence of insulation at this point.

In my present construction, the tendency of the short-circuiting segments to stick is obviated by shaping the faces thereof in such a manner that the contacting faces of the short-circuiting segments will bridge or rock over the insulation when moving away from a position of rest to their commutator short-circuiting position or vice versa.

Referring to the drawings,—

Figure 1 is a side elevational view partly in section through a motor equipped with my improved short-circuiting device.

Fig. 2 is a detail view of one of the short-circuiting segments.

Fig. 3 is an enlarged view showing the short-circuiting segments in their movements to their short-circuiting position.

Fig. 4 illustrates the position of the segments when they rock over the insulation as the motor increases its speed.

Fig. 5 shows the short-circuiting segments rocked over the insulation and seated in the lateral groove in the face of the commutator segments supporting them.

In the drawings, 1 indicates the motor casing, 2 the armature shaft, 3 the armature or rotor and 4 the field core. 5 indicates the commutator shell secured to the armature shaft by a pin 6 and carrying armature segments 7 in its periphery, which armature segments are insulated from the shell.

The shell is undercut, as at 5$^a$, and the securing ring 8 is also undercut so that the dovetailed inner edges of the commutator segments together with the insulation therebetween and the commutator shell are securely held in position,—the securing ring 8 being secured in place by spinning over the flange 5$^b$ on the commutator shell. The provision of an integrally spun flange avoids the use of bolts or other detachable securing means, to hold the ring 8 in place and makes a tight fastening. The outer face of the commutator shell is formed with a concentric shoulder seat 5ᶜ in which the inner faces of the heads of the short-circuiting segments 9 are intended to be caught and arrested when the speed of the motor decreases in approaching a cessation of rotation.

By referring to Fig. 2, it will be noted that the short-circuiting segments are provided with enlarged heads, the inner faces of which are inclined or beveled, as at 9ª, so as to fit the concentric groove 5ᶜ in the commutator shell. These short-circuiting segments 9 have a hook 9ᵇ at their inner ends which engage an inturned flange 11ª of a keeper ring or member 11 slidingly mounted on the shaft 2. Within this ring and also slidingly mounted on the shaft is a supporting collar 12 having a flange extending parallel to the shaft and which is arranged under the inner ends of the short-circuiting segments 9, thus preventing their inward displacement. 13 indicates a spring tending at all times to force the rings 11 and 12 inwardly, said spring bearing at its outer ends against a nut 14, which nut is threaded on the shaft and provided with cross slots or grooves 14ª in its lower face, in which is seated the ends of a locking pin 15 passing through an opening in the shaft 2. By this means, compression spring 13 may be adjusted and the nut 14, after the proper adjustment is effected, locked in position.

The operation of the device is as follows: Assuming that the motor is at rest and the short-circuiting segments are in the position shown in Fig. 1. Current is now supplied to motor.

In starting, certain armature coils are short-circuited by means of short-circuited brushes, not shown, resting on segments 7, thus developing a torque, and as the motor gains speed the heavy outer ends of the short-circuiting segments move outwardly under the action of centrifugal force, the outward movement of the heads of the short-circuiting segments compressing the spring 13. The beveled or inclined faces 9ª of the short-circuiting segments cause them in their outward movement, when the motor attains the requisite predetermined speed, to rock from one edge to the other so that the insulation between the commutator shell and commutator segments is bridged and the liability of any segment hanging or sticking in this outward movement is reduced to a minimum.

The outward movement of short-circuiting segments is arrested by shoulders 7ª formed on the commutator segments so that in their final position, as shown in Fig. 5, the short-circuiting segments rest against this shoulder and further outward movement thereof is stopped.

When the speed of the motor is reduced, as when being brought to a state of rest by shutting off the current thereto, the energy of spring 13 is exerted to force the rings 11 and 12 inwardly and draw the heads of the short-circuiting segments away from the commutator segments. In the position of the parts shown in Fig. 4, assuming that the motor is coming to a position of rest, it will be seen that, as the short-circuiting segments move inwardly, they start to rock approximately at a point opposite the insulation and bridge the insulation, until attaining the position shown in Fig. 3, after which they are moved to the position shown in Fig. 1. The fulcrum or pivot about which the short-circuiting segments move inwardly and outwardly relative to the shaft in the above described operation is formed by the engagement between the hooked inner ends of said segments and the inturned flange of the ring 11.

The short-circuiting segments are shown in the drawings as L-shaped. The outer or foot portion of each segment is weighted or made heavier, as shown in Fig. 2. The extremity of said foot-portion, or what might be designated as the toe of the foot, has corners or edges upon which the short-circuiting segment is rocked over or bridges the insulation in moving toward or away from a position of rest. The inner end or leg portion of the short-circuiting segment is formed with the hooked end 9ᵇ providing a fulcrum which coöperates with the inturned flange of ring 11, and when the hooks of the short-circuiting segments engage the flange of the keeper ring, the retaining ring 12 prevents the displacement of the inner hooked ends of the short-circuiting segments.

What I claim is:

1. A centrifugally operated commutator short-circuiting device for motors comprising the combination of an armature shaft, a commutator shell carried thereby, commutator segments arranged around said shell, insulation between said commutator segments and said shell, centrifugally operated short-circuiting segments whose outer ends engage and are supported by the shell when the motor is at rest, the engaging faces of said short-circuiting segments being beveled or inclined whereby when they move outwardly to engage and short-circuit the commutator segments they rock over or bridge the insulation between the commutator segments and their supporting shell.

2. A centrifugally operated commutator short circuiting segment comprising a member whose foot portion is weighted, the extremity of said foot portion having corners or edges upon which the short circuiting segment is rocked in moving toward and from a position of rest.

3. A centrifugally operated commutator short-circuiting device for motors comprising the combination of an armature shaft, a commutator shell carried thereby, commutator segments arranged around said shell, insulation between said commutator segments and said shell, centrifugally operated short-circuiting segments, a keeper ring upon which the inner ends or leg portions of said segments are fulcrumed, means for moving said keeper ring inwardly to restore the short-circuiting segments to normal position when the motor is at rest, the foot portions of said short-circuiting segments normally engaging and resting upon the commutator shell when the motor is at rest, the corners of said foot portions being so related to the commutator shell and commutator segments carried thereby that, when the short-circuiting segments move outwardly to engage and short-circuit the commutator segments, they rock over or bridge the insulation between the commutator segments and their supporting shell.

4. A centrifugally operated commutator short circuiting segment comprising a member whose foot portion is weighted and whose leg portion is provided with a hooked extension, the extremity of said foot portion, where it engages the parts with which it is to coöperate, having corners or edges upon which the short-circuiting segment is alternately rocked in moving toward and from a position of rest.

5. A centrifugally operated commutator short circuiting device for commutators consisting of commutator segments, a commutator shell, insulation between said commutator segments and said commutator shell and short-circuiting means in which the engaging surface of the commutator segments, the commutator shell, the insulation, the short-circuiting means, are so shaped and arranged as the short-circuiting means engages or disengages with the commutator segments that the engaging face of the short-circuiting means rocks over or bridges the insulation between the commutator segments and the commutator shell.

6. A centrifugally operated commutator short circuiting segment comprising a member whose contact portion is weighted and whose fulcrum portion is provided with a hooked extension, the contact portion where it engages the parts with which it coöperates, having corners or edges upon which the short-circuiting segment is alternately rocked in moving toward and from a position of rest.

In testimony whereof I hereunto affix my signature this 8th day of June, 1920.

JOHN A. DRIY.